(12) United States Patent
Mungula

(10) Patent No.: US 7,653,929 B2
(45) Date of Patent: Jan. 26, 2010

(54) POWER MANAGEMENT APPARATUS, SYSTEMS, AND METHODS

(75) Inventor: Peter R. Mungula, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 915 days.

(21) Appl. No.: 10/880,148

(22) Filed: Jun. 28, 2004

(65) Prior Publication Data

US 2005/0289621 A1     Dec. 29, 2005

(51) Int. Cl.
*H04N 7/173* (2006.01)
*H04N 7/16* (2006.01)

(52) U.S. Cl. .................... 725/131; 725/140; 725/152

(58) Field of Classification Search ............... 725/100, 725/131–132, 139–140, 151–152; 713/300, 713/500, 600
See application file for complete search history.

(56) References Cited

U.S. PATENT DOCUMENTS

| | | | |
|---|---|---|---|
| 5,473,385 A | | 12/1995 | Leske |
| 6,058,242 A | * | 5/2000 | Kim .......................... 386/83 |
| 6,560,240 B1 | | 5/2003 | Borland et al. |
| 6,681,396 B1 | * | 1/2004 | Bates et al. .................... 725/58 |
| 6,829,781 B1 | * | 12/2004 | Bhagavath et al. ............ 725/94 |
| 7,216,358 B1 | * | 5/2007 | Vantalon et al. ............... 725/25 |
| 7,263,275 B2 | * | 8/2007 | Demas et al. ................... 386/68 |
| 2002/0133826 A1 | * | 9/2002 | Ohyama ........................ 725/87 |
| 2003/0165323 A1 | | 9/2003 | Demas et al. |
| 2003/0221136 A1 | * | 11/2003 | Kubo ............................ 713/322 |

FOREIGN PATENT DOCUMENTS

TW            413753        12/2000

OTHER PUBLICATIONS

"International Search Report for corresponding PCT Application No. PCT/US2005/021606", (Nov. 16, 2005), 4 pgs.
Anikhindi, S., et al., "A Commercial DVB-T Demodulator Chipset", *IEE, International Broadcasting Convention, Conference Publication No. 447*, (Sep. 12, 1997),528-533.
"Chinese Application Serial No. 200580017312.2, Office Aciton mailed Dec. 19, 2008", 18 pgs.
"Japan Application No. 2007-518146, Office Action mailed on Oct. 13, 2009", 4 pgs.
"China Application No. 200580017312.2, Office Action mailed on Jul. 27, 2009", 5 pgs.

* cited by examiner

*Primary Examiner*—Hunter B. Lonsberry
*Assistant Examiner*—Ngoc K Vu
(74) *Attorney, Agent, or Firm*—Schwegman, Lundberg & Woessner, P.A.

(57) ABSTRACT

An apparatus and a system, as well as a method and article, may operate to adjust the rate of a clock to be coupled to a processor, such as a video stream processor, according to a previously communicated data rate associated with a data stream selected from a number of data streams.

29 Claims, 3 Drawing Sheets

POWER MANAGEMENT APPARATUS, SYSTEMS, AND METHODS

TECHNICAL FIELD

Various embodiments described herein relate to information processing generally, including apparatus, systems, and methods used to process streams of information.

BACKGROUND INFORMATION

Electronic devices may be designed to operate at speeds selected for processing a maximum anticipated data rate. Such operation may be suboptimal when data rates vary over a wide range, such as when changes from tuner to tuner occur in a video system (e.g., during channel surfing activity). In such devices, system power usage may be greater than necessary when relatively low-speed data rates are encountered.

DETAILED DESCRIPTION

In some embodiments, the clock frequency of a computing element that processes an input selected from a plurality of inputs can be changed dynamically, perhaps to meet some selected minimum processing requirement for the currently-selected input. For example, in a digital video system, a single transport demultiplexer engine, perhaps including a video stream processor, might be shared among multiple tuners, each having a different rate associated with its received data stream. As changes are made from one tuner to the next (e.g., during channel surfing), the demultiplexer clock rate may also change to meet the processing requirements of the selected incoming stream. Thus, some embodiments may be useful in situations where a shared processing element processes one input at a time, selected from several, wherein the non-selected inputs are not waiting for a processing time slot (e.g., when the multiple inputs are not time-division multiplexed).

It should be noted that although embodiments of apparatus, systems, and/or methods associated with video data streams may be included herein as examples, other embodiments may be realized. Some embodiments may be associated with data streams encoding audio, olfactory, tactile, taste, genetic sequence, stream of consciousness, and/or telemetry data, for example.

For the purposes of this document, an "indicator" or "indication" may mean any mechanism (e.g., a circuit, an object, a software or hardware flag, a register, an interrupt, etc.) that provides information about a level of processing resource usage with respect to a data stream, including, but not limited to: a buffer/storage fill level, a forecast of buffer/storage fill velocity, a prior buffer/storage fill acceleration rate, a level of congestion in a network or at a port, an operating frequency, a clock speed, a data transport speed, a data acquisition speed, a forecast change in data acquisition speed, a number of write operations over time, a prior number of read operations over time, etc.

A "stream processor" or "video stream processor" includes any type of processor or computer that may receive a video data stream for processing, perhaps coupled to a display to display content associated with the video data stream. Examples include, but are not limited to, a video graphics card that can be coupled to a computer bus, a hand-held video game device, and a cellular telephone, among others. Stream processors may also receive non-video stream data for processing.

Figure 1:
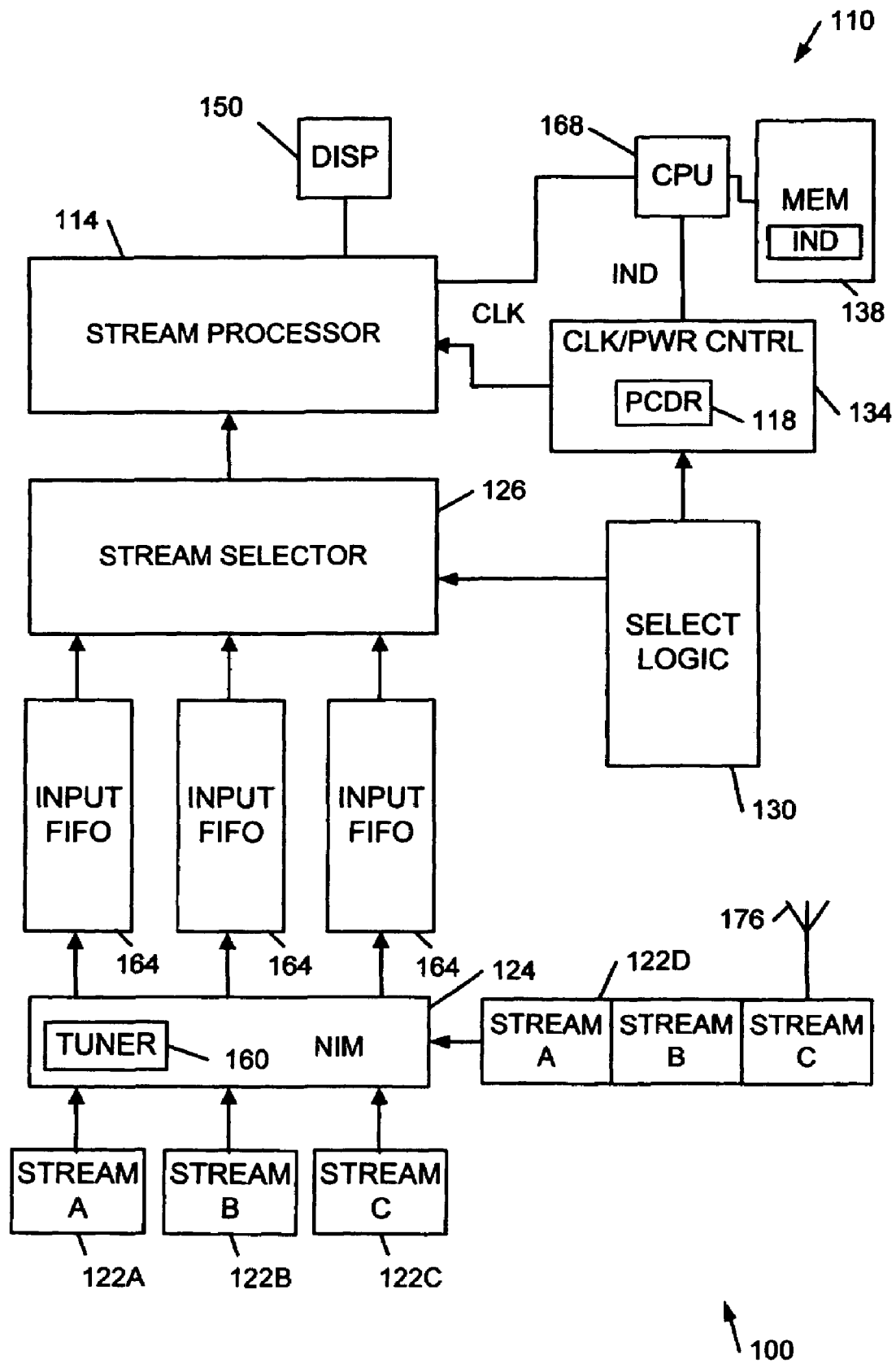
FIG. 1 is a block diagram of an apparatus and a system according to various embodiments.

FIG. 1 is a block diagram of an apparatus 100 and a system 110 according to various embodiments of the invention. For example, an apparatus 100 may include a video stream processor 114 having a clock rate adjustable according to a previously communicated data rate 118 associated with a data stream (e.g., one of the streams STREAM_A, STREAM_B, STREAM C) selected from a plurality of data streams 122A-122C. A previously communicated data rate may comprise a data rate that is communicated to the processor 114 prior to any processing that is accomplished with respect to the streams 122A-122D. The previously communicated data rate may also change over time with respect to a single stream, such as the stream 122D, which may comprise a concatenation of streams STREAM_A, STREAM_B, and STREAM C.

Examples of a previously communicated data rate include a data rate associated with one or more of the following: a source identification (e.g., ATSC tuner), a source capability (e.g., up to about 5 mbits/second), an actual data rate (e.g., about 11 mbits/second), a data type (e.g., differential pulse code modulation (DPCM), and a protocol (e.g., MPEG-2). For more information regarding the Moving Picture Experts Group (MPEG)-2format, see Generic Coding of Moving Pictures and Associated Audio Information, MPEG-2 International Standard, ISO/IEC JTC1/SC29/WG11, November 1994 and later versions, and/or other sources.

The video stream processor 114 may operate to process a selected stream (e.g., STREAM_A), perhaps as selected by a stream selection module 126 coupled to the video stream processor 114, and/or a network interface module (NIM) 124. The stream selection module 126 may also be coupled to the plurality of data streams 122, including the selected data stream (e.g., STREAM_A), and may include a plurality of switches (not shown), known to those of ordinary skill in the art. For example, STREAM_A may be provided by an ATSC (Advanced Television System Committee) tuner, STREAM_B may be provided by a satellite feed tuner, and STREAM_C may be provided by yet another transport stream source (e.g. internet protocol, digital video, etc.). For more information regarding ATSC standards, including digital television standards, please see *ATSC Standard A/*53 (1995): ATSC Digital Television Standard, Advanced Television Systems Committee, Washington, D.C., 1994, as well as amendments thereto.

In some embodiments, the apparatus 100 may include a logic module 130 that can be coupled to the stream selection module 126 so as to select one of the streams (e.g., STREAM_A). A clock control module 134 may be coupled to the video stream processor 114 to provide a clock CLK having a speed associated with the clock rate of the video stream processor 114. The apparatus 100 may also include a memory 138 to store an indication IND of one or more previously communicated data rates of the selected data stream. Other embodiments may be realized.

For example, a system 110 may include an apparatus similar to or identical to the apparatus 100 previously described, a display 150 that can be coupled, directly or indirectly (e.g., via bus and/or separate processor), to the video stream processor 114, and/or an antenna 176 that can be coupled, directly or indirectly, to a physical data stream 122D. The antenna 176 may be selected from one or more of an omni-directional antenna, a patch antenna, a dipole antenna, a uni-directional antenna, an infra-red transmitter, an infra-red receiver, photo-emitters and receptors, and charge-coupled devices, among others. The display 150 may comprise a high-definition television (HDTV) display.

In some embodiments, the system 110 may further include a network interface module (NIM) 154 to couple to a plurality of data streams 122A, 122B, and/or 122C, including the selected data stream (e.g., STREAM_A). In some embodiments, the NIM 154 may be coupled to a physical data stream 122D comprising a plurality of logical data streams (e.g. a concatenation of STREAM_A, STREAM_B, and STREAM_C). The NIM 154 may in turn include one or more tuning modules 160. In some embodiments, the system 110 may also include one or more first-in, first-out memories 164 (e.g., 164A, 164B, 164C), perhaps coupled to the NIM 154 and used to receive one or more of the data streams 122, including the selected data stream (e.g., STREAM_A via memory 164A).

The system 110 may include a second processor 168 that can be coupled to the video stream processor 114. The second processor 168 may be used to provide an indication IND of one or more previously communicated data rates 118 to a clock control module 134 that can be coupled to the video stream processor 114.

The apparatus 100, systems 110, video stream processor 114, data streams 122A, 122B, 122C, 122D, STREAM_A, STREAM_B, and STREAM C, stream selection module 126, logic module 130, clock control module 134, memory 138, display 150, NIM 154, tuning module 160, first-in, first-out memories 164, processor 168, omnidirectional antenna 176, previously communicated data rate 118, and indication IND may all be characterized as "modules" herein. Such modules may include hardware circuitry, and/or one or more processors and/or memory circuits, software program modules, including objects and collections of objects, and/or firmware, and combinations thereof, as desired by the architect of the apparatus 100 and systems 110, and as appropriate for particular implementations of various embodiments of the invention.

It should also be understood that the apparatus and systems of various embodiments can be used in applications other than for television and/or networked display systems, and thus, various embodiments are not to be so limited. The illustrations of apparatus 100 and systems 110 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, personal digital assistants (PDAs), workstations, radios, video players, vehicles, and others.

Figure 2:
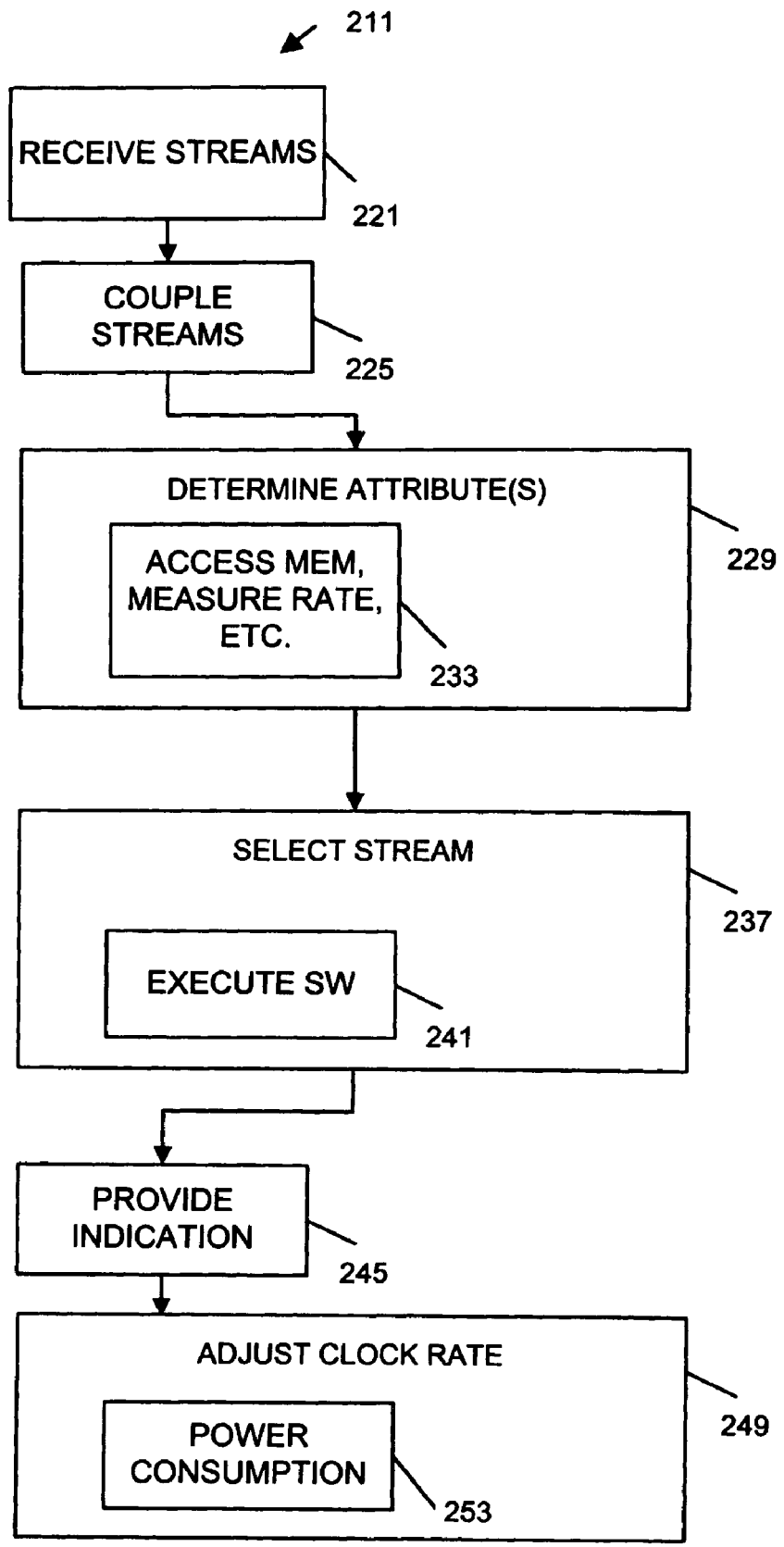
FIG. 2 is a flow chart illustrating several methods according to various embodiments.

FIG. 2 is a flow chart illustrating several methods according to various embodiments of the invention. Thus, in some embodiments, a method 211 may (optionally) begin with receiving a selected data stream at a stream selection module, which may be coupled to a video stream processor at block 221. Thus, the method 211 may include coupling a plurality of data streams (including the selected data stream), perhaps provided by a corresponding plurality of tuners, to the video stream processor at block 225.

In some embodiments, the method 211 may include determining one or more previously communicated data rates of the selected data stream at block 229. For example, determining one or more of the previously communicated data rates may occur by accessing a memory comprising a lookup table and/or one or more registers at block 233. Similarly, determining one or more of the previously communicated data rates may include measuring a data rate associated with the selected data stream at block 233. As noted elsewhere, the previously communicated data rate may comprise a rate associated with one or more of a source identification, a source capability, an actual data rate, a data type, and a protocol, among others.

In some embodiments, the method 211 may include selecting the selected data stream included in the plurality of data streams at block 237. For example, selecting the selected data stream may occur by executing host controller software included in a television and/or a set-top box at block 241.

The method 211 may include providing an indication of one or more of the previously communicated data rates to a clock control module, which may in turn be coupled to the video stream processor at block 245.

The method 211 may further include adjusting the rate of a clock to be coupled to the video stream processor at block 249. The clock rate may be adjusted according to one or more previously communicated data rates associated with the selected data stream. The rate of the clock may be adjusted for any number of reasons, such as to support a maximum data rate of the selected data stream, or perhaps according to a desired power consumption level. For example, at block 249, the method 211 may include adjusting the rate of the clock coupled to a processor, including a video stream processor, according to at least one previously communicated data rate associated with selected data stream, wherein the processor is to process the selected data stream. As noted previously, the method 211 may include selecting the selected data stream from a plurality of available data streams at a stream selection module to be coupled to the processor (see block 237).

It should be noted that the methods described herein do not have to be executed in the order described, or in any particular order. Moreover, various activities described with respect to the methods identified herein can be executed in serial, parallel, or iterative fashion. For the purposes of this document, the terms "information" and "data" may be used interchangeably. Information, including parameters, commands, operands, and other data, including data in various formats (e.g., time division, multiple access) and of various types (e.g., binary, alphanumeric, audio, video), can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment. Thus, other embodiments may be realized, as shown in FIG. 3.

Figure 3:
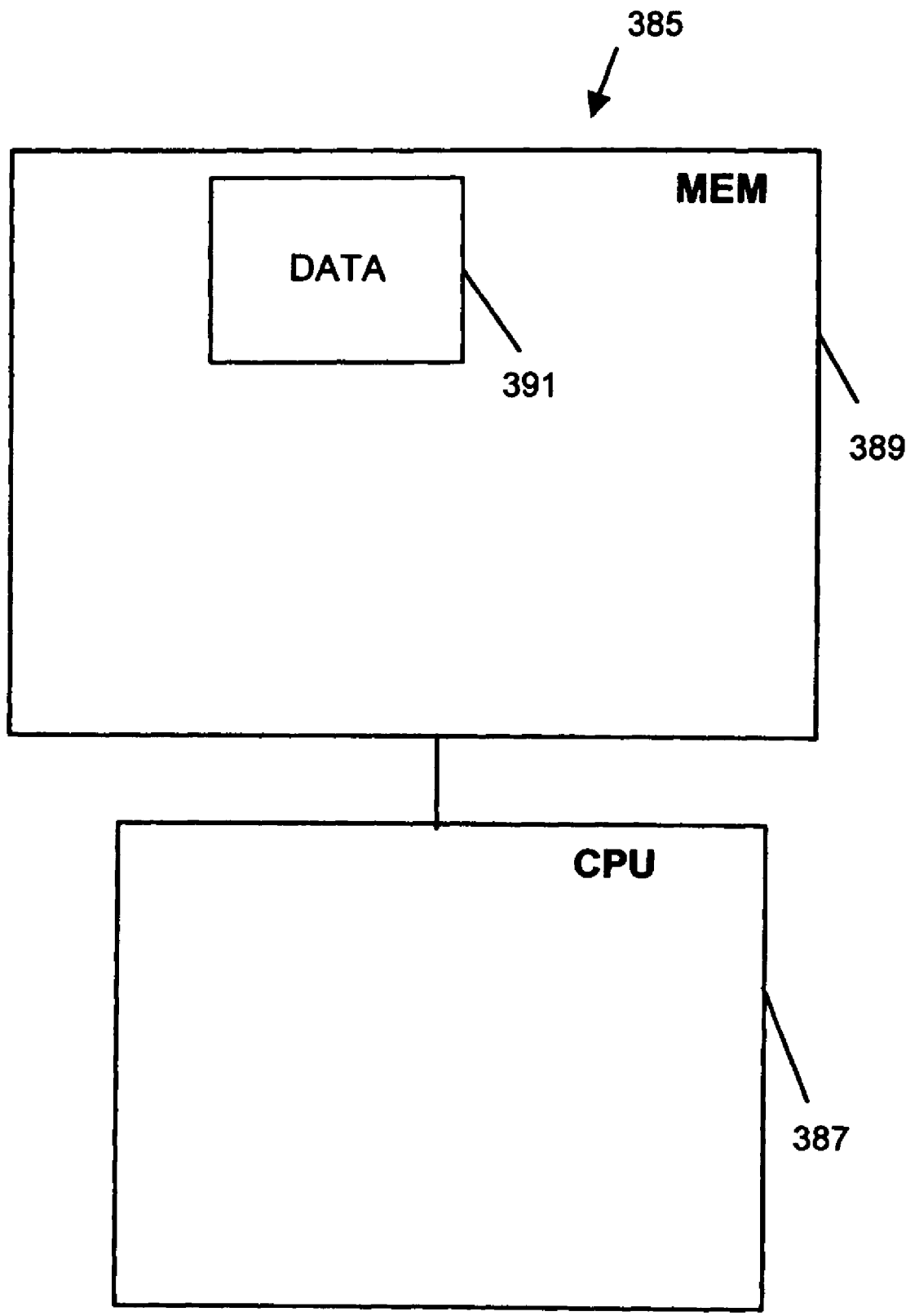
FIG. 3 is a block diagram of an article according to various embodiments.

FIG. 3 is a block diagram of an article 385 according to various embodiments, such as a computer, a memory system, a magnetic or optical disk, some other storage device, and/or any type of electronic device or system. The article 385 may comprise a processor 387 coupled to a machine-accessible medium such as a memory 389 (e.g., a memory including an electrical, optical, or electromagnetic conductor) having associated information 391 (e.g., computer program instructions, and/or other data), which when accessed, results in a machine (e.g., the processor 387) performing such actions as adjusting the rate of a clock to be coupled to a video stream processor according to at least one previously communicated data rate associated with a selected data stream, wherein the video stream processor is to process the selected data stream. Other activities may include executing host controller software included in one of a television and a set-top box to select the selected data stream, and accessing a memory comprising one of a lookup table and a register (and/or measuring the data rate associated with the selected data stream) to determine one or more previously communicated data rates of the data stream, among others. Further activities may include adjusting the rate of the clock according to a desired power consumption level.

Implementing the apparatus, systems, and methods described herein may result in systems having scalable performance and power usage, adaptable to broad variations in data rates from a variety of streaming inputs, as may be encountered during channel surfing activities. The energy efficiency of various appliances may be improved, along with reducing system costs associated with heat removal (e.g., fans, heat sinks, etc.).

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, including:
adjusting a rate of a clock to be coupled to a video stream processor according to a previously communicated data rate associated with a data stream selected from a plurality of data streams, wherein the video stream processor is to process the selected data stream, and wherein the rate of the clock is adjusted after the data stream has been selected from the plurality of data streams.

2. The method of claim 1, wherein the previously communicated data rate comprises a rate associated with at least one of a source identification, a source capability, an actual data rate, a data type, and a protocol.

3. The method of claim 1, further including:
receiving the selected data stream at a stream selection module to be coupled to the video stream processor.

4. The method of claim 1, further including:
coupling the plurality of data streams provided by a corresponding plurality of tuners, including the selected data stream, to the video stream processor.

5. The method of claim 1, further including:
selecting the selected data stream included in the plurality of data streams; and
providing an indication of the previously communicated data rate to a clock control module to be coupled to the video stream processor.

6. The method of claim 5, wherein the indication includes at least one bit to indicate the previously communicated data rate.

7. An article including a machine-accessible medium storing computer program instructions and other data, wherein the computer program instructions and other data, when accessed, results in a machine performing:
adjusting a rate of a clock to be coupled to a video stream processor according to a previously communicated data rate associated with a data stream selected from a plurality of data streams, wherein the video stream processor is to process the selected data stream, and wherein the rate of the clock is adjusted after the data stream has been selected from the plurality of data streams.

8. The article of claim 7, wherein the computer program instructions and other data, when accessed, results in a machine performing:
executing host controller software included in one of a television and a set-top box to select the selected data stream.

9. The article of claim 7, wherein the computer program instructions and other data, when accessed, results in a machine performing:
adjusting the rate of the clock according to a desired power consumption level.

10. The article of claim 7, wherein the computer program instructions and other data, when accessed, results in a machine performing:
accessing a memory comprising one of a lookup table and a register to determine the previously communicated data rate.

11. The article of claim 7, wherein the computer program instructions and other data, when accessed, results in a machine performing:
measuring a data rate associated with the selected data stream to determine the previously communicated data rate.

12. An apparatus, including:
a video stream processor having a clock rate adjustable according to a previously communicated data rate associated with a data stream selected from a plurality of data streams, wherein the video stream processor is to process the selected data stream, and wherein the clock rate is adjusted after the data stream has been selected from the plurality of data streams.

13. The apparatus of claim 12, further including:
a stream selection module to be coupled to the video stream processor and to the plurality of data streams including the selected data stream.

14. The apparatus of claim 13, further including:
a logic module to be coupled to the stream selection module and to select the selected stream.

15. The apparatus of claim 12, further including:
a clock control module to be coupled to the video stream processor and to provide a clock having a speed associated with the clock rate.

16. The apparatus of claim 12, further including:
a memory to store an indication of the previously communicated data rate.

17. A system, including:
a display; and
a video stream processor to be coupled to the display and having a clock rate adjustable according to a previously communicated data rate associated with a data stream selected from a plurality of data streams, wherein the video stream processor is to process the selected data stream, and wherein the clock rate is adjusted after the data stream has been selected from the plurality of data streams.

18. The system of claim 17, further including:
a network interface module to couple to the selected data stream.

19. The system of claim 18, further including:
at least one first-in, first-out memory to be coupled to the network interface module and to receive the selected data stream.

20. The system of claim 18, wherein the network interface module includes:
a tuning module.

21. The system of claim 17, further including:
a network interface module to couple to the plurality of data streams including the selected data stream.

22. The system of claim 21, further including:
at least one first-in, first-out memory to be coupled to the network interface module and to receive the selected data stream.

23. The system of claim 21, wherein the network interface module includes:
a tuning module.

24. The system of claim 17, further including:
an omnidirectional antenna coupled to the selected data stream.

25. The system of claim 17, further including:
a second processor to be coupled to the video stream processor and to provide an indication of the previously communicated data rate to a clock control module to be coupled to the video stream processor.

26. The system of claim 17, wherein the display comprises a high-definition television (HDTV) display.

27. A method, including:
adjusting a rate of a clock to be coupled to a processor according to a previously communicated data rate associated with a data stream selected from a plurality of data streams, wherein the processor is to process the selected data stream, and wherein the rate of the clock is adjusted after the data stream has been selected from the plurality of data streams.

28. The method of claim 27, wherein the previously communicated data rate comprises a rate associated with at least one of a source identification, a source capability, an actual data rate, a data type, and a protocol.

29. The method of claim 27, further including:
selecting the selected data stream from the plurality of available data streams at a stream selection module to be coupled to the processor.

* * * * *

UNITED STATES PATENT AND TRADEMARK OFFICE
CERTIFICATE OF CORRECTION

PATENT NO. : 7,653,929 B2 Page 1 of 1
APPLICATION NO. : 10/880148
DATED : January 26, 2010
INVENTOR(S) : Peter R. Mungula It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1180 days.

Signed and Sealed this

Twenty-eighth Day of December, 2010

David J. Kappos
*Director of the United States Patent and Trademark Office*